United States Patent
Kopikare et al.

(10) Patent No.: US 9,215,657 B1
(45) Date of Patent: *Dec. 15, 2015

(54) METHOD AND APPARATUS FOR ADJUSTING WINDOWS DURING WHICH REQUEST SIGNALS TO DISCOVER NETWORK DEVICES ARE TRANSMITTED AND CORRESPONDING RESPONSES ARE RECEIVED

(71) Applicant: Marvell International Ltd., Hamilton (BM)

(72) Inventors: Milind Kopikare, San Jose, CA (US); Sarang Shrikrishna Wagholikar, Sunnyvale, CA (US); Raja Banerjea, Sunnyvale, CA (US); Ken Kinwah Ho, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 7 days.

This patent is subject to a terminal disclaimer.

(21) Appl. No.: 14/258,322

(22) Filed: Apr. 22, 2014

Related U.S. Application Data

(63) Continuation of application No. 13/782,252, filed on Mar. 1, 2013, now Pat. No. 8,711,825, which is a continuation of application No. 12/793,827, filed on Jun. 4, 2010, now Pat. No. 8,391,260.

(60) Provisional application No. 61/219,283, filed on Jun. 22, 2009.

(51) Int. Cl.
H04W 4/00 (2009.01)
H04W 52/02 (2009.01)
H04W 48/16 (2009.01)

(52) U.S. Cl.
CPC .......... *H04W 52/0216* (2013.01); *H04W 48/16* (2013.01)

(58) Field of Classification Search
None
See application file for complete search history.

(56) References Cited

U.S. PATENT DOCUMENTS

| 8,391,260 | B1 | 3/2013 | Kopikare et al. |
| 8,458,504 | B2 | 6/2013 | Kangude et al. |
| 8,711,825 | B1 | 4/2014 | Kopikare et al. |
| 8,902,864 | B2 * | 12/2014 | Laroia et al. .................. 370/338 |

(Continued)

OTHER PUBLICATIONS

Peer-to-Peer Technical Task Group; Peer-to-Peer Technical Specification; Revision 1.0; May 12, 2009; 105 page.

(Continued)

*Primary Examiner* — Frank Duong

(57) ABSTRACT

A first device includes a physical-layer device, an adjusting module, and a power module. The physical-layer device transmits, during each of first windows, a request signal from the first device to discover one or more network devices. The first windows occur during a first period of time. The physical-layer device receives responses to the request signal from network devices. Each of the responses is received during a respective one of the first windows. The adjusting module, based on the responses to the request signal, determines whether to adjust lengths of second windows or a number of the second windows to occur during a second period of time. The second period of time occurs subsequent to and is a same length as the first period of time. The power module, during each of the second windows, transitions the first device between being powered ON and being at least partially powered OFF.

20 Claims, 7 Drawing Sheets

(56) References Cited

U.S. PATENT DOCUMENTS

2010/0325459 A1    12/2010    Kangude et al.
2011/0158115 A1    6/2011    Sun et al.

OTHER PUBLICATIONS

ISO/IEC 8802-11, ANSI/IEEE Std 802.11, First Edition 1999-00-00; Information technology—Telecommunications and information exchange between systems—Local and metropolitan area networks—Specific requirements—Part 11: Wireless LAN Medium Access Control (MAC) and Physical Layer (PHY) Specifications; Aug. 20, 1999; 531 pages.

IEEE Std 802.11a-1999 (Supplement to IEEE Std 802.11-1999) Supplement to IEEE Standard for Information technology—Telecommunications and information exchange between systems—Local and metropolitan area networks—Specific requirements—Part11: Wireless LAN Medium Access Control (MAC) and Physical Layer (PHY) specifications: High-Speed Physical Layer in the 5 GHz Band; LAN/MAN Standards Committee of the IEEE Computer Society; Sep. 16, 1999; 91 pages.

IEEE Std. 802.11b; Supplement to IEEE Standard for Information technology—Telecommunications and information exchange between systems—Local and metropolitan area networks—Specific Requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 2009; 96 pages.

IEEE P802.11g/D8.2 Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; Apr. 2003; 69 pages.

\* cited by examiner

METHOD AND APPARATUS FOR ADJUSTING WINDOWS DURING WHICH REQUEST SIGNALS TO DISCOVER NETWORK DEVICES ARE TRANSMITTED AND CORRESPONDING RESPONSES ARE RECEIVED

CROSS-REFERENCE TO RELATED APPLICATIONS

The present disclosure is a continuation of U.S. patent application Ser. No. 13/782,252 (now U.S. Pat. No. 8,711,825), filed Mar. 1, 2013, which is a continuation of U.S. patent application Ser. No. 12/793,827 (now U.S. Pat. No. 8,391,260) filed on Jun. 4, 2010. This application claims the benefit of U.S. Provisional Application No. 61/219,283, filed on Jun. 22, 2009. The entire disclosures of the above applications referenced above are incorporated herein by reference.

FIELD

The present disclosure relates to power management systems for peer-to-peer devices.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A wireless local area network (WLAN) typically permits wireless communication between multiple network devices. A WLAN can be operated in a number of different modes including, for example, an "infrastructure mode" or an "ad hoc mode". In a wireless network that operates according to the infrastructure mode (referred to herein as an "infrastructure mode network"), all network devices communicate with a central base station (e.g., an access point). In a wireless network that operates according to the ad hoc mode (referred to herein as a peer-to-peer (P2P) network), network devices communicate directly with each other rather than through a central base station.

Infrastructure mode networks typically include a discovery server and/or a coordination server for discovery and connection setup between network devices (e.g., mobile devices). The discovery and coordination servers obtain information regarding network connected peers and application-specific information. The discovery and coordination servers are typically located at an access point. A peer-to-peer (P2P) network generally does not include a discovery server, a coordination server, or an access point. Network devices (or peer devices) of a P2P network communicate directly with each other (referred to as WiFi direct).

Discovery of peer devices within a P2P network may include an active phase or find phase. An active phase may include a first network device transmitting probe messages to peer devices (i.e., other network devices). The first network device may transmit probe messages to join a P2P network and/or to communicate with another network device. A probe message includes, for example, a basic service set identifier (BSSID) and data rates of the first network device. Peer devices operating in a "listen" mode (at the time a probe message is sent by the first network device) may respond to the probe message by sending a probe response signal. The find phase may include toggling between listen and search modes.

Network devices typically operate in a "sleep" mode to conserve power. While operating in a sleep mode a network device may be partially powered down or fully powered down. Network devices that perform active and/or passive scanning may transition between operating in a listen mode and a sleep mode.

SUMMARY

A client network device is provided and includes a physical-layer device, a parameter module, an adjusting module, and a power management module. The physical-layer device is configured to, during each client traffic window of one or more client traffic windows that occur within a predetermined period, (i) transmit, over a network, a request signal from the client network device to discover other network devices in the network, and (ii) receive, from one or more of the other network devices, one or more corresponding responses to the request signal. The parameter module is configured to monitor a first parameter of the client network device. The adjusting module is configured to adjust a second parameter based on the first parameter. The second parameter indicates a number of the one or more client traffic windows to occur within the predetermined period. The power management module is configured to transition the client network device from an active mode to a sleep mode between consecutive ones of the number of the one or more client traffic windows that occur within the predetermined period.

In other features, a method is provided and includes, via a physical-layer device and during each client traffic window of one or more client traffic windows that occur within a predetermined period, (i) transmitting, over a network, a request signal from a client network device to discover other network devices in the network, and (ii) receiving, from one or more of the other network devices, one or more corresponding responses to the request signal. The method further includes: monitoring a first parameter of the client network device; adjusting a second parameter based on the first parameter, where the second parameter indicates a number of the one or more client traffic windows to occur within the predetermined period; and transitioning the client network device from an active mode to a sleep mode between consecutive ones of the number of the one or more client traffic windows that occur within the predetermined period.

A network device of a peer-to-peer network includes a parameter monitoring module. The parameter monitoring module is configured to monitor a network device parameter of the network device. A client traffic window adjusting module is configured to adjust at least one of N client traffic window parameters based on the network device parameter. The N client traffic window parameters include at least one of: a length of a client traffic window; and a number of client traffic windows within a predetermined period. A physical layer device is configured to receive a discovery response signal from a peer-to-peer device during a period of the client traffic window.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
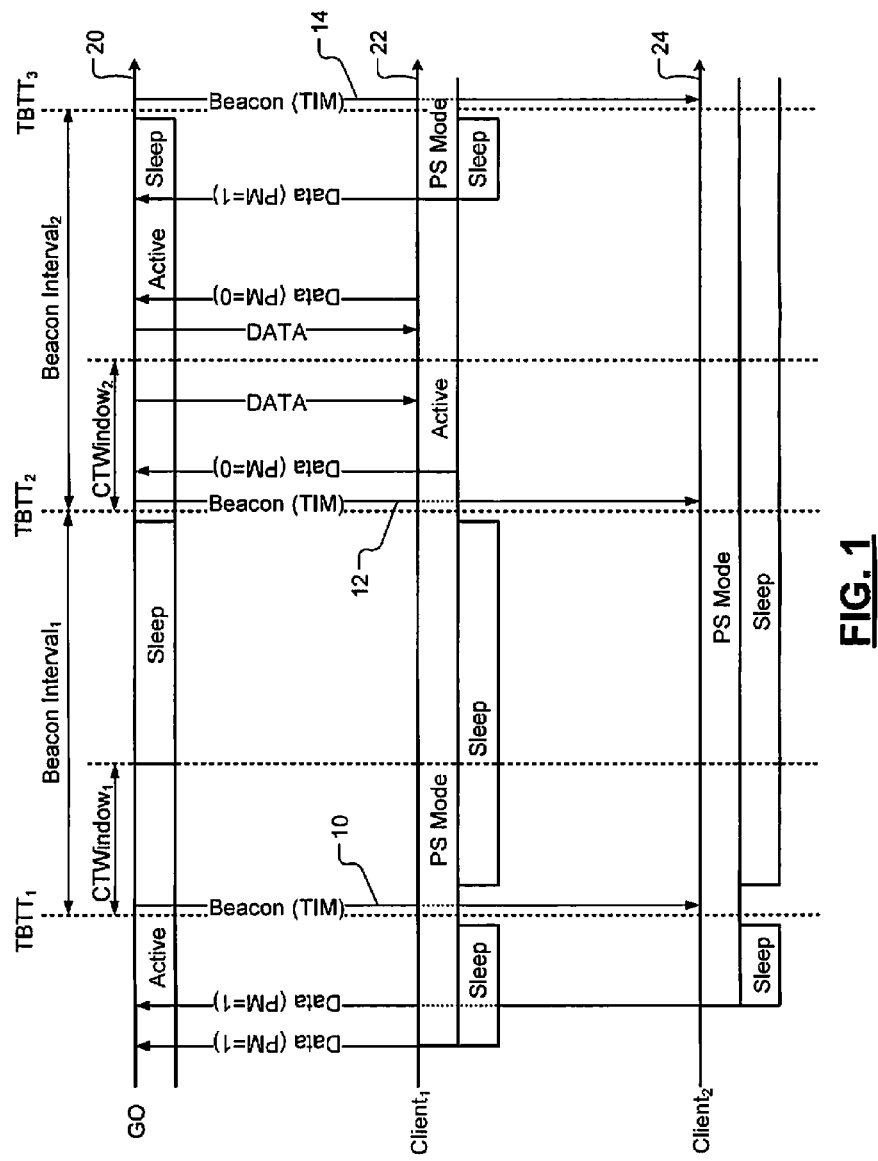
FIG. 1 is a P2P network signal timing diagram illustrating an example opportunistic power save method.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

In the following description, a network device may refer to a P2P device, a mobile device and/or a mesh point, a non-mobile device, a service request device (SRD), user equipment (UE), and/or a mobile node. A network device can include equipment of an end user, such as a processor, a radio interface adaptor, etc. A network device may be, for example, a cellular phone, a smart phone, a personal data assistant (PDA), a printer, a camera, a computer, a router, etc. The network devices described herein may comply with the "Wi-Fi Peer-to-Peer (P2P) Technical Specification" of the Wi-Fi Alliance (WFA) Peer-to-Peer Technical Task Group, which is incorporated herein by reference in its entirety.

A network device may refer to and/or include a control module, a transceiver, a protocol stack of a transceiver and/or communication layers, such as a physical (PHY) layer, a media access control (MAC) layer, a radio link control (RLC) layer, a packet data convergence protocol (PDCP) layer, a RRC layer, etc. Although a particular number of each network device is shown, any number of each network device may be included in a network. Each of the network devices may be considered as a remote network device relative to another network device or peer device.

Also, in the following description a beacon and a beacon signal may be associated with synchronous communication and include a service set identifier (SSID) or a basic SSID (BSSID), Internet protocol (IP) address, time synchronization bits, characteristic bits, capability bits, information elements etc. of a host device (device transmitting beacon signal). The characteristic bits may indicate characteristics of a device, such as data rates, frequencies or channels of operation, etc. The capability bits may indicate capabilities of a device, such as Internet access capability, printing capability, half duplex and/or full duplex mode capability, and communication protocol and application capabilities. Information Elements can contain P2P specific information about the transmitting device. A beacon and a beacon signal may be transmitted by a first network device to announce to other network devices presence of the first network device and to relay information to the other network devices. Beacon and beacon signals may be generated periodically, or at irregular or sporadic intervals. The timing of the beacons and the beacon signals may be based on the duration of corresponding listen and sleep periods.

In addition, in the following description a probe request and a probe request signal may be associated with asynchronous communication and include a SSID or BSSID, IP address, characteristic bits, capability bits, information request bits, information elements etc. of a host device. The information request bits may identify information requested by the network device that transmits the probe request signal. The information request bits may, for example, be used to request characteristics and capabilities of peer devices. Information Elements can contain P2P specific information about the transmitting device.

Furthermore, in the following description, a beacon response signal and probe response signal may include a BSSID, time synchronization bits, characteristic bits, capability bits, information request bits, data (i.e., user) bits, etc of a peer device that responds to a beacon or probe request signal. The beacon response signal and the probe response signal may be generated by a network device that respectively receives a beacon signal or a probe request signal. The beacons, beacon signals, probe request signals, beacon response signals, and probe response signals may satisfy IEEE 802.11 standards.

In the "Wi-Fi Peer-to-Peer (P2P) Technical Specification" of the WFA Peer-to-Peer Technical Task Group an opportunistic power save (PS) method is described in section 3.3.3.1. The method is directed to peer-to-peer (P2P) power management that supports power save mechanisms for P2P group owners and P2P clients of a P2P network. The method allows a group owner to be absent (operating in a sleep mode) for defined absent periods. As the group owner is absent for certain periods, a client traffic (CT) window is introduced for discoverability purposes. The CT window is shorter than a beacon interval. The group owner is ON during a period of the CT window and is listening for P2P clients.

The CT window may, for example, be defined as being 10-20% the length of the beacon interval. As an example, a beacon interval may be 100 milliseconds (ms), whereas the length of the CT window may be 10 ms. This provides power savings for the group owner, as the group owner may be in a sleep mode approximately 90% of the time. The group owner is in a sleep mode more than in an active mode and/or a listen mode to conserve power.

In FIG. 1, a P2P network signal timing diagram illustrating an example opportunistic power save method is shown. A P2P network may, for example, include a group owner GO, a first client $Client_1$ and a second client $Client_2$. The group owner (GO) may transmit a beacon signal at a target beacon transmission time (TBTT) after each beacon interval ($TBTT_1$, $TBTT_2$ and $TBTT_3$ and corresponding beacon signals 10-14 are shown).

The timing diagram illustrates times during which the clients $Client_1$, $Client_2$ operate in an active mode (e.g., discovery powered ON mode), a power save (PS) mode, and/or a sleep mode. An active mode may refer to a client performing in a beacon mode (e.g., a probe request mode) or a listen mode. The clients $Client_1$, $Client_2$ generate and transmit beacon signals while operating in a beacon mode. The clients $Client_1$, $Client_2$ generate and transmit probe request signals while operating in a probe request mode.

The timing diagram illustrates periods associated with a first series of operating modes on a first time axis 20, a second series of operating modes on a second time axis 22 and a third series of operating modes on a third time axis 24. The first series of operating modes is associated with the group owner GO. The second series of operating modes is associated with the first client device $Client_1$. The third series of operating modes is associated with the second client device $Client_2$.

The group owner GO is in the active mode during CT window periods and is in a sleep mode between CT windows periods. The clients $Client_1$, $Client_2$ may operate in an active mode, a power save (PS) mode and a sleep mode. During the active mode, the clients $Client_1$, $Client_2$ may communicate, for example, with the group owner GO. During the PS mode, the clients $Client_1$, $Client_2$ may be partially powered to receive the beacon signals. During the sleep mode the clients $Client_1$, $Client_2$ may be partially or fully depowered (OFF).

In the example illustration shown, the first $Client_1$ does not communicate with the GO during a first beacon interval and does communicate with the GO during a second beacon interval. The first $Client_1$ operates in the PS mode when not operating in the active mode. The first $Client_1$ may operate in the sleep mode between TBTTs and when not operating in the active mode.

The second client $Client_2$ does not communicate with the GO during the first and second beacon intervals and operates in the PS mode. The second client $Client_2$ may not operate in the sleep mode when a TBTT is transmitted, as shown for the first $TBTT_1$. The second client $Client_2$ may operate in the sleep mode when a TBTT is transmitted, as shown for the second $TBTT_2$.

The PS modes and/or sleep modes may begin when the clients $Client_1$, $Client_2$ transmit a power management (PM) mode signal of 1 to the group owner GO. PM mode signals indicate whether the clients $Client_1$, $Client_2$ have data to send to the group owner GO. A PM signal of 0 indicates that the clients $Client_1$, $Client_2$ do have data to send. The PS modes may begin when the clients $Client_1$, $Client_2$ transmit a PM mode signal indicating that they do not have data to send to the group owner GO. For example only, a PM mode signal of 1 indicates that clients $Client_1$, $Client_2$ do not have data to send to the GO.

Data may be sent between the group owner GO and the clients $Client_1$, $Client_2$ during the CT window periods and/or after the CT window periods. The group owner GO may remain in an active state during non-CT window periods (between CT window periods and TBTTs) when the GO is communicating with one of the clients $Client_1$, $Client_2$.

The group owner GO maintains a CT window length (e.g., 10-20 ms) that is adequate to detect a first P2P client. Packet transmission from the first P2P client to the group owner can be delayed due to traffic between other network devices. The other network devices may be communicating in the same area using the same medium as the first P2P client. The first P2P client backs off from transmitting when other activity is detected to prevent interference. The other activity may include any packet transmission on the same medium and/or frequency band as the group owner GO.

For example, an access point or other group owner may be communicating with another network device, such as a Legacy client in a basic service set (BSS) of an adjacent network. The Legacy client may not communicate with the group owner GO, as shown, or may communicate with the group owner GO and become part of the P2P network. As another example, a second P2P client may be communicating with the group owner. The first P2P client may periodically retry transmitting to the group owner based on detected traffic in the medium.

As a result, the group owner stays awake (ON) for at least a predetermined CT window period (length of CT window). The group owner remains awake for the predetermined CT window period regardless of whether a P2P client sends a packet to the group owner.

Power savings with the above-described method is directly proportional to the amount of time that the group owner GO is in a sleep mode. As an example, if the group owner GO has a beacon interval of 100 ms, power savings is approximately 90% compared to a system where the group owner GO remains ON 100% of the time. While this power savings is considerable further power savings can be provided using the below described systems and methods.

Figure 2:
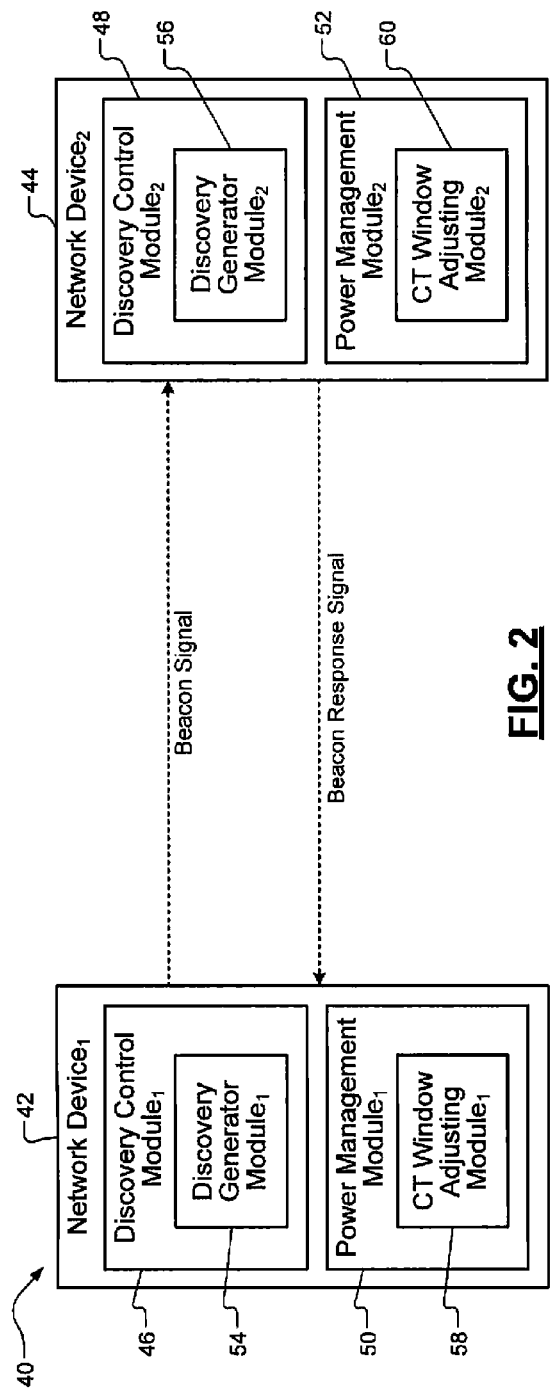
FIG. 2 is a functional block diagram of a P2P network in accordance with an embodiment of the present disclosure.

In FIG. 2, a P2P network ("P2P network") is shown. The P2P network 40 includes peer network devices 42, 44 that each operates in an active mode, a PS mode, and/or a sleep mode. When operating in the active mode, a group owner may transmit beacon signals and listen for beacon response signals. Beacon signals may be periodically transmitted by a group owner to P2P clients. Beacons may be generated, for example, by a group owner and/or probe request signals may be generated by a P2P client when there is data to be transmitted to a peer device. When operating in the PS and/or sleep modes, the network devices are partially powered down or fully powered down.

The network devices 42, 44 include respective discovery control modules 46, 48 and power management modules 50, 52. The discovery control modules 46, 48 include discovery generator modules 54, 56. The discovery generator modules 54, 56 determine durations of time in which the peer network devices 42, 44 are to operate in the active, PS and sleep modes. The power management modules 50, 52 include CT window adjusting modules 58, 60 that adjust duration of CT windows.

Figure 3:
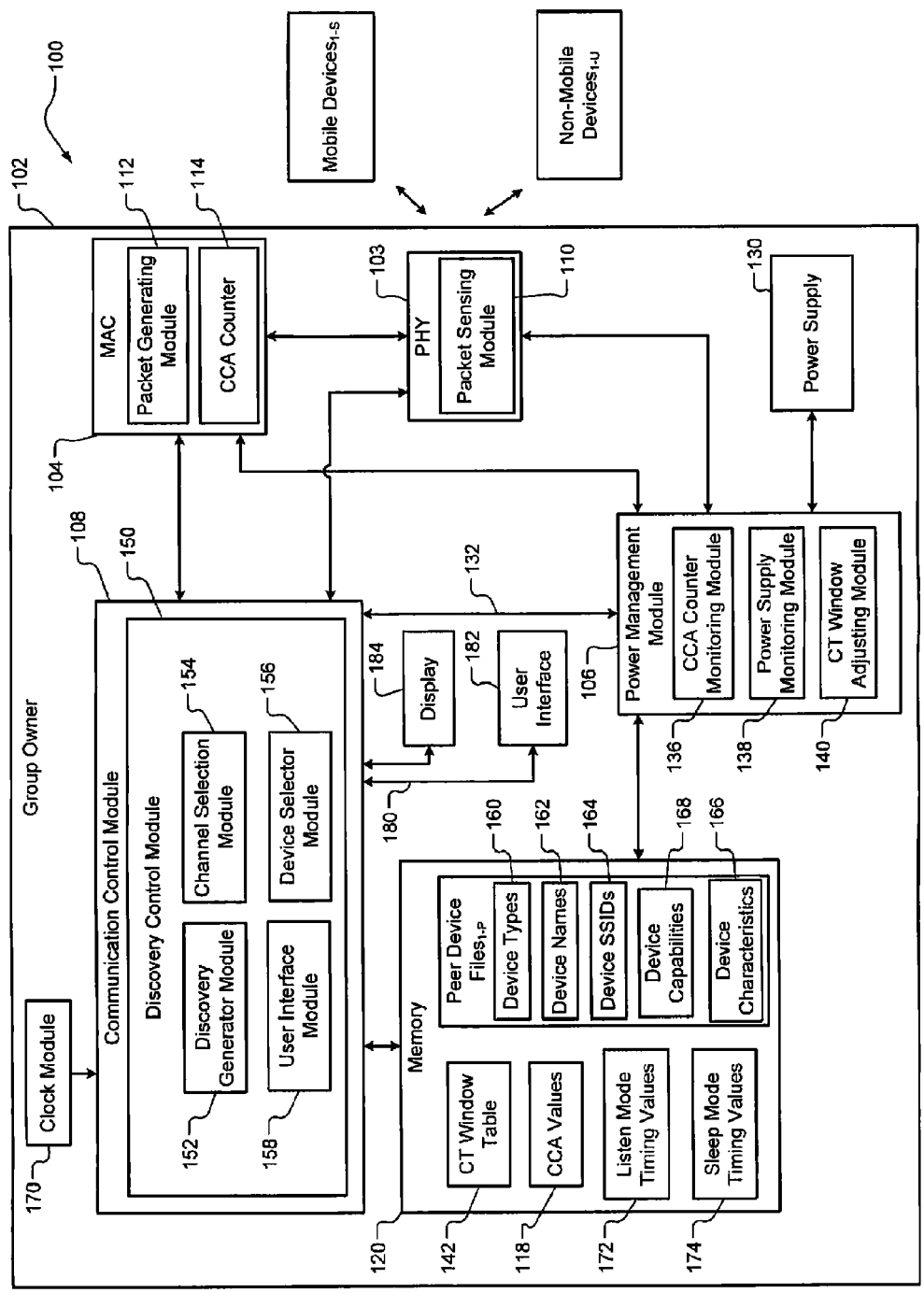
FIG. 3 is a functional block diagram of another P2P network illustrating a group owner in accordance with an embodiment of the present disclosure.

In FIG. 3, a P2P network 100 is shown. The P2P network 100 includes a group owner 102, mobile $devices_{1-S}$ and non-mobile $devices_{1-U}$. S is the number of mobile devices and is greater than or equal to 1. U is the number of non-mobile devices and is an integer greater than or equal to 1. The group owner 102, the mobile $devices_{1-S}$ and the non-mobile $devices_{1-U}$ are referred to as network devices.

The network devices may operate in active or passive scanning modes and discover and communicate directly and wirelessly with each other. The network devices may discover and communicate directly and wirelessly with each other. The group owner 102 or host (mobile or non-mobile) device operates in a discovery mode when transmitting beacon and/or probe signals to identify other active network devices within a predetermined distance of the host device. Each of the network devices may operate in a half-duplex mode and/or a full-duplex mode. The network devices may communicate using wireless protocols, such as Wi-Fi network protocols, wireless local area network (WLAN) protocols, IEEE 802.11 wireless network protocols, etc.

The group owner 102 includes a physical layer (PHY) device 103, a media access controller (MAC) 104, a power management module 106, and a communication control module 108. The mobile devices$_{1-s}$ and non-mobile devices$_{1-u}$ may each include the same or similar elements as the group owner.

The PHY device 103 interfaces the group owner with the mobile devices$_{1-s}$ and non-mobile devices$_{1-u}$. For example, the PHY device 103 transmits or receives beacon signals (i.e., beacons), probe request signals, beacon response signals and/or probe response signals to and from the mobile devices$_{1-s}$ and non-mobile devices$_{1-u}$. The PHY device 103 includes a packet sensing module 110 and handles data transfer to and from the mobile devices$_{1-s}$ and non-mobile devices$_{1-u}$. The packet sensing module 110 detects activity in the P2P network 100 including transmission of beacon signals, probe request signals, beacon response signals, probe response signals, packets and/or data. The activity may be between the network devices and/or between network devices of an adjacent network (e.g., a Legacy network including a Legacy client and an access point). The PHY device 103 may include radio frequency (RF) and baseband circuitry.

The MAC 104 handles generating and parsing of frames. The MAC 104 includes a packet generating module 112 and a clear channel assessment (CCA) counter 114. The packet generating module 112 schedules, generates and/or transfers packets from the communication control module 108 to the PHY device 103 for transmission to one of the mobile devices$_{1-s}$ and non-mobile devices$_{1-u}$.

The CCA counter 114 indicates whether there is activity in the P2P network 100 based on an activity signal generated by the packet sensing module 110. The packet generating module 112 may randomly back off transmitting packets based on CCA values 118 associated with the CCA counter 114. The packet generating module 112 may periodically retry transmission of the packets. The CCA counter 114 may increment based on detected IEEE 802.11 packets in a medium of the network devices. The CCA values 118 of the CCA counter 114 may be stored in memory 120 and may be accessible by the power management module 106 and the communication control module 108.

The CCA counter 114 may, for example, be set to 0 when no activity is detected. The CCA counter 114 may be a non-zero value when there is activity. The activity may include packet transmission from a network device other than the group owner 102. The value of the CCA counter 114 may be based on the number of packets received by the packet sensing module 110. The activity may include packet transmission from a network device that is not in the P2P network 100. A network device is considered part of a P2P network when the network device is discovered and/or accepted by the group owner 102.

The power management module 106 controls power distribution from a power supply 130 to the PHY device 103, the MAC 104, and the communication control module 108. The power management module 106 may also control when the group owner 102 is operating in sleep modes. The power management module 106 may be part of the communication control module 108. The sleep modes are based on a timing signal (included in bi-directional signals 132) from the communication control module 108. The timing signal may include start times, durations and/or end times for listen and/or sleep modes. The durations are adjusted to adjust discovery time and power efficiency. The start times, durations and end times may be generated based on CT windows, as described below.

The power management module 106 includes parameter monitoring modules, such as a CCA counter monitoring module 136 and a power supply monitoring module 138. The CCA counter monitoring module 136 monitors the CCA counter values 118. The power supply monitoring module 138 monitors state of the power supply 130. The state of the power supply 130 may include, for example, a battery charge level.

The power management module 106 also includes a CT window adjusting module 140. The CT window adjusting module 140 may determine, set, and adjust length(s) of CT window(s) based on the CCA counter values 118 and/or the state of the power supply 130. The CT window adjusting module 140 may access, adjust, and store CT window lengths and/or a CT window table 142 in the memory 120. The CT window table 142 may be based on a relationship between CT window lengths, CCA counter values, power supply charge levels (battery charge levels), etc. The CCA counter monitoring module 136, the power supply monitoring module 138 and the CT window adjusting module 140 may be firmware based.

The power management module 106 may depower the group owner 102 during the sleep modes. During the sleep modes, certain devices or modules may remain powered, for example, for reactivation purposes. For example, the power management module 106 may remain active to determine when to repower other devices and/or modules of the group owner 102 subsequent to a sleep mode. The group owner 102 generates beacons or probe response signals when reactivated and operating in the discovery mode.

The communication control module 108 processes data transmitted to and received from the network devices. The communication control module 108 includes a discovery control module 150. The discovery control module 150 may be referred to as a P2P state machine and includes a discovery generator module 152, a channel selection module 154, a device selector module 156, and a user interface module 158. The discovery control module 150 controls discovery operations including the generating, receiving and processing of discovery signals. The discovery control module 150 also controls the accessing and storing of discovery information, such as the characteristics and capabilities of the group owner 102 and of discovered peer devices. This information is stored in memory 120 in respective peer files$_{1-P}$, where P is an integer that is greater than or equal to 2. P is greater than or equal to S, U and/or S+U.

The peer files$_{1-P}$ include device types 160, device names 162, device SSIDs 164, device characteristics 166, device capabilities 168, etc. The device types 160 indicate, for example, whether a device is a router, a computer, a printer, a hub, a server, etc. The device names 162 are user recognizable names or names that a user can identify. For example, a SSID is not a user recognizable name, as a SSID may be a device specific number or other identifier. A device name, as used herein, refers to terms or labels, such as "printer", "fax", "contact name", etc. that a user of the group owner 102 recognizes and can select upon being discovered.

The discovery control module 150 generates timing signals via the discovery generator module 152 while operating in the discovery mode. The discovery generator module 152 generates the timing signals based on CT window(s) and clock signals from a clock module 170 and stored in the memory 120. The discovery generator module 152 generates listen mode timing values 172 and sleep mode timing values 174, such as start times, durations and/or end times of listen and sleep modes based on the CT window(s). The PHY device 103, the MAC 104, the power management module 106, the communication control module 108 and/or the discovery control module 150 may be partially or fully powered down when the group owner 102 is in the sleep mode.

The channel selection module 154 selects a channel (i.e., frequency or range of frequencies) on which to transmit a beacon or probe request signal. The device selector module 156 selects one or more of the discovered network devices. The selection is based on a predetermined criterion and/or based on a user request signal (included in bi-directional signals 180) received from a user interface 182. The predetermined criterion may include device requirements, such as distance, location, type, data rate, frequency, channel, etc. For example, the device selector module 156 may select the one of the mobile devices$_{1-s}$ that: is within a certain distance from the group owner 102; communicates at a predetermined speed; and communicates on a particular frequency. As another example, the group owner 102 may be a cellular phone that is searching for printers and selects Y printers out of X discovered printers. One of the Y printers may be selected as a default, based on a predetermined criterion and/or based on a user request signal. The user may select one of the Y printers, which is displayed to the user via a display 184. The user interface 182 may be, for example, a keypad, a touch screen, etc.

One of the mobile devices$_{1-s}$ and non-mobile devices$_{1-u}$ may randomly transmit packets to the group owner 102 to determine whether the group owner 102 is operating using a mini-CT window. A mini-CT window refers to a CT window that is shorter in length than a base CT window. For example, a base CT window may be approximately 10-20 ms in length and a mini-CT window may be less than 10 ms in length. The mobile devices$_{1-s}$ and non-mobile devices$_{1-u}$ can determine that the group owner 102 is using a mini-CT window when a response from the group owner 102 is not received during a period of the base CT window.

Although the devices and modules of FIG. 3 are shown as distinct items, one or more may be implemented as a single item and/or implemented on a single IC. For example, the PHY device 103, the MAC 104, the power management module 106, the communication control module 108, the memory 120, and the clock module 170 may be implemented as a single item and/or on a single IC.

Figure 4:
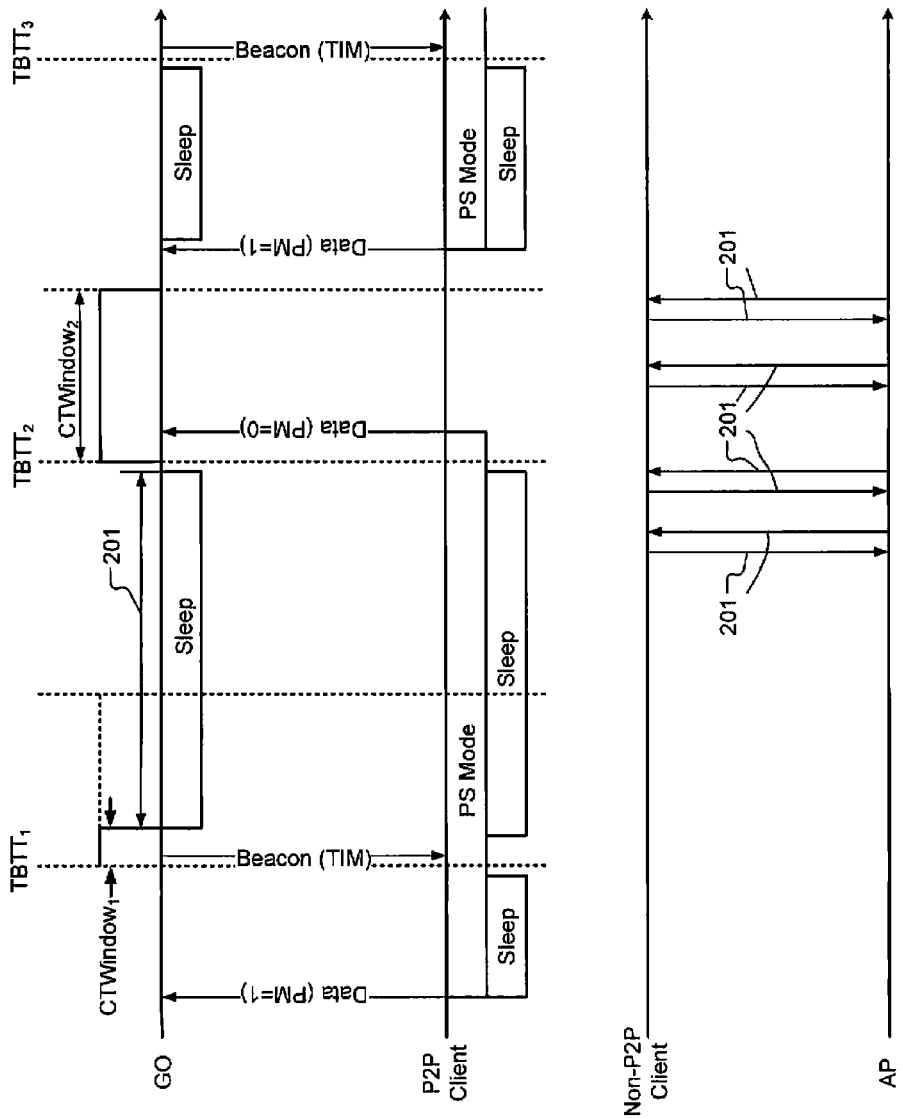
FIG. 4 is a P2P network signal timing diagram illustrating another opportunistic power save method including a mini-CT window in accordance with an embodiment of the present disclosure.

In FIG. 4, a P2P network signal timing diagram illustrating another opportunistic power save method including a mini-CT window is shown. For the embodiment of FIG. 4, operating modes for a group owner GO and a P2P client of a P2P network are shown. An adjacent network that is operating using the same medium and/or frequency band as the P2P network may include an access point (AP) and a non-P2P client (not a member of the P2P network). Operating modes for the AP and the non-P2P client are also shown in FIG. 4. The frequency band may include any range of frequencies. Example frequency bands are the IEEE 802.11 2.4 and 5.0 GHz frequency bands, such as the 802.11A, 802.11B and 802.11G frequency bands.

The group owner GO may transmit a beacon signal at a target beacon transmission time (TBTT) after each beacon interval. The timing diagram illustrates times during which the group owner GO and the P2P client operate in an active mode, a PS mode, and/or a sleep mode. The timing diagram also illustrates communication between the AP and the non-P2P client signals 200.

The group owner GO may use a first CT window (CT Window$_1$ or mini-CT window) when the group owner GO does not detect activity on the medium. Activity is detected based on CCA logic and/or a CCA counter. The group owner GO may use a second CT window (CT Window$_2$ or base CT window) when the group owner GO does detect activity on the medium. The first CT window CT Window$_1$ is shorter in length than the second CT window CT Window$_2$. For example only, the first CT window CT Window$_1$ may be 100 microseconds (μs) and the second CT window CT Window$_2$ may be 10 ms. The use of the shorter CT window allows for an increased sleep mode period, as designated by 202. This further conserves power. The sleep mode period 202 is increased, as a portion of the sleep mode period is within the first CT window$_1$.

The length of the second CT window$_2$ may be adjusted based on the activity detected on the medium, a CCA value, a battery charge level, etc. The group owner GO may remain active while communicating with the P2P client. The group owner GO receives a PM signal of 1 when the P2P client does not have data to send to the group owner GO. The group owner GO receives a PM signal of 0 when the P2P client has data to send to the group owner GO. Data may be received from the P2P client during or after periods of the CT windows$_{1,2}$. The group owner GO may return to the sleep mode after receiving a PM mode signal of 1 from the P2P client.

The length of the CT windows$_{1,2}$ may be transmitted to the P2P client. The lengths of the CT windows$_{1,2}$ may be sent as part of a discovery signal, a beacon signal, a probe response signal, etc. The P2P client transmits discovery (beacon) response signals based on the lengths of the CT windows$_{1,2}$ and the TBTTs. The lengths of the CT windows$_{1,2}$ and the TBTTs may be determined by the group owner GO and provided from the group owner to the P2P client.

The length of the mini-CT window is long enough for the P2P client to transmit a packet to the group owner GO. In addition, as the length of the mini-CT window is less than the length of the base CT window, the group owner GO may be in the sleep mode for an increased amount of time. This further conserves power. For example, during large idle periods, when there are no packets to be transmitted, the group owner GO is awake for the mini-CT window period (e.g., 100 μs). This is 1/100$^{th}$ of the time associated with the base CT window.

A P2P client and/or a group owner may detect transmission of a packet by a Legacy BSS. This may be referred to as a 'hidden' transmission in view of the group owner. The group owner may: adjust length of a CT window, a mini-CT window, and/or return to or remain in a sleep mode when hidden packets are transmitted. For example, the group owner GO increases the length of the CT window from the first CT window$_1$ to the second CT window$_2$ upon detecting the hidden packets. The group owner also returns to the sleep mode after detecting the hidden packets and a PM signal of 1 from the P2P client.

Figure 5:
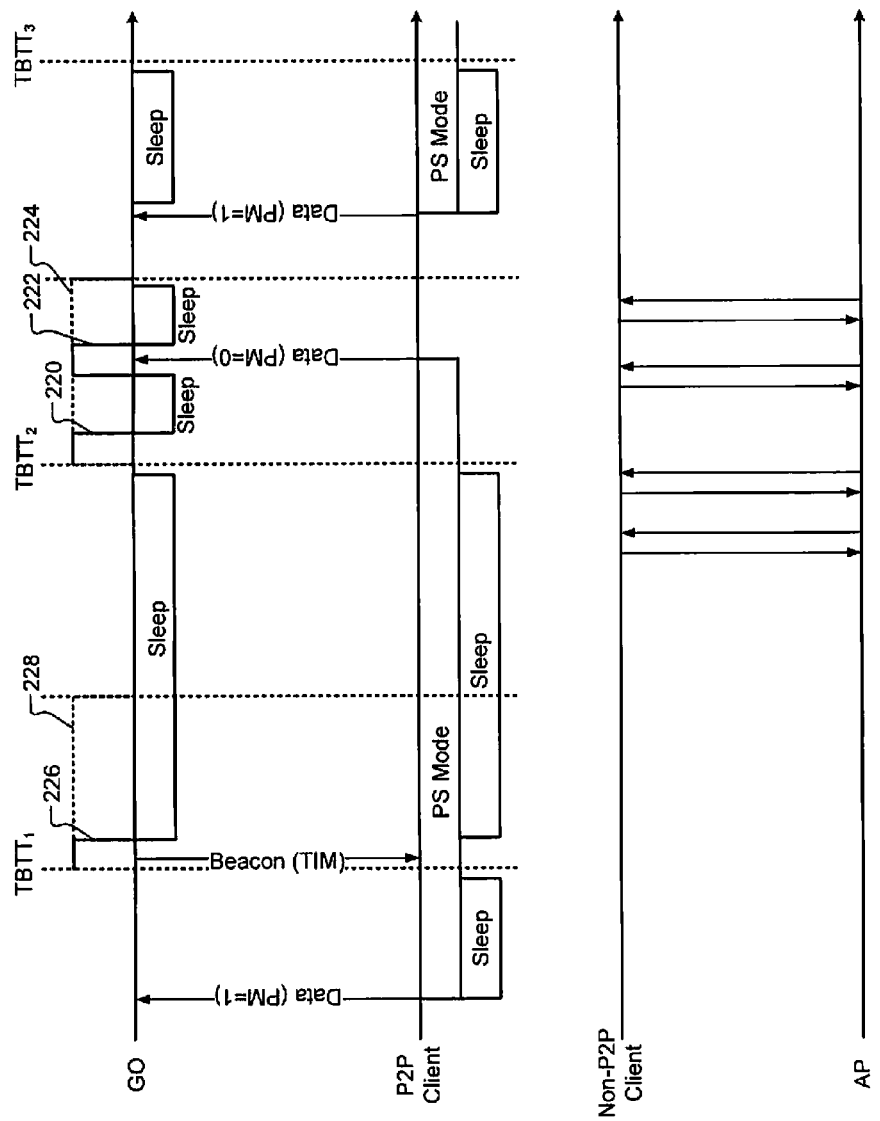
FIG. 5 is a P2P network signal timing diagram illustrating yet another opportunistic power save method with multiple CT windows during a base CT window period and in accordance with an embodiment of the present disclosure.

In FIG. 5, a P2P network signal timing diagram illustrating yet another opportunistic power save method with multiple (e.g., second and third) mini-CT windows 220, 222 during a base CT window period (e.g., second base CT window period 224) is shown. For the embodiment of FIG. 5, operating modes for a group owner GO and a P2P client of a P2P network are shown. An adjacent network that is operating using the same medium and/or frequency band as the P2P network may include an AP and a non-P2P client. Operating modes for the AP and the non-P2P client are also shown in FIG. 5. The group owner GO may transmit a discovery request (beacon) signal at a target beacon transmission time (TBTT) after each discovery request (beacon) interval.

The group owner GO may increase the number of mini-CT windows over a base CT window period, increase the number of corresponding sleep modes, and/or decrease the length of the corresponding sleep modes. As an example, a first (single) mini-CT window 226 is shown after a first TBTT and during a predetermined or first base CT window period 228. The second mini-CT window 220 and the third mini-CT window 222 are shown after a second TBTT and during the second base CT window period 224. The second based CT window period is shown as being the same length as the first based CT window period. The group owner GO may be in the sleep mode between and after the second and third mini-CT window periods 220, 222. The length of the sleep modes subsequent the second and third mini-CT window periods 220, 222 may each be, for example, approximately 400 μs in length. The length of the first and second base CT window periods 224, 228 may be, for example, 10 ms.

Any number of mini-CT windows and corresponding sleep mode periods may be used during a single predetermined base CT window period. The sleep modes may be consecutive to the mini-CT window periods. The number of mini-CT windows may be adjusted based on activity on a medium, CCA values, battery charge levels, etc. As shown, the group owner GO may detect the P2P client (receive a PM signal of 0) during the third mini-CT window and not during the second mini-CT window. Thus, the increased number of CT windows increases the probability that the P2P client is detected by the group owner GO.

Figure 6A:
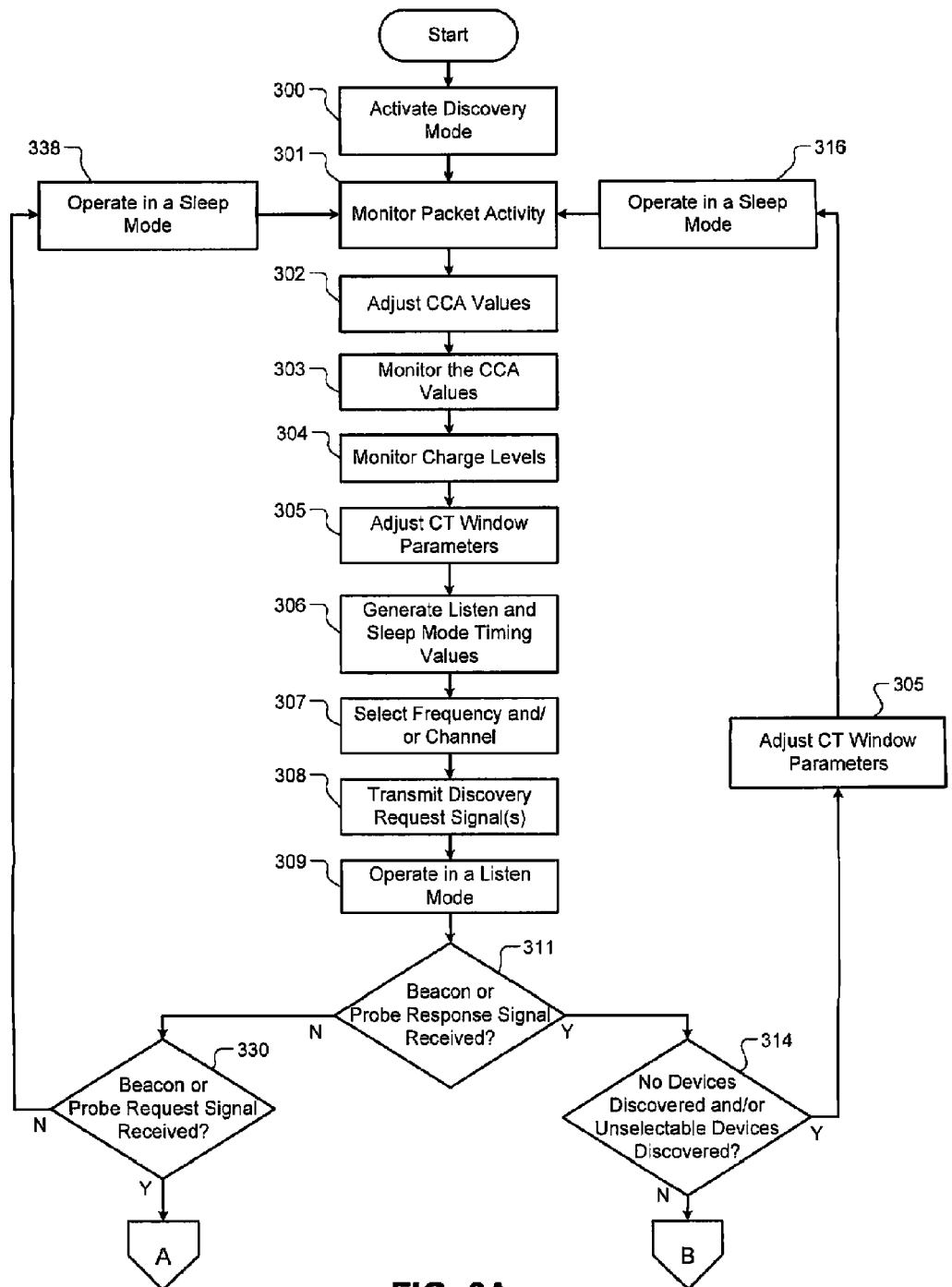
FIGS. 6A and 6B are a logic flow diagram illustrating a method of operating a network device (group owner) in accordance with an embodiment of the present disclosure.
Figure 6B:
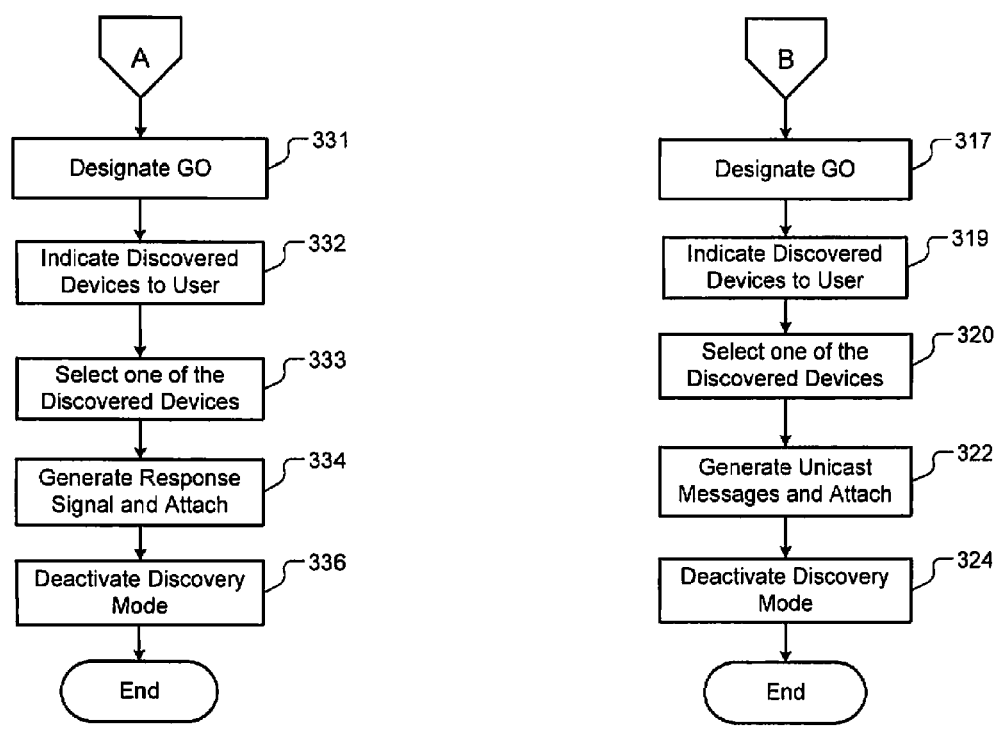

In FIGS. 6A and 6B, a method of operating a network device (group owner) including a method of determining a length of a CT window is shown. The methods may be implemented by any of the network devices shown in FIGS. 2 and 3. Although the following tasks are described primarily with respect to the embodiments of FIGS. 3-5, the tasks may be applied to other embodiments of the present disclosure.

At 300, the discovery control module 150 activates a discovery mode to discover other mobile and non-mobile devices. At 301, the packet sensing module 110 monitors activity on a medium. The packet sensing module 110 generates an activity signal based on the activity. The activity signal may indicate when no activity is detected.

At 302, the CCA counter 114 adjusts the CCA value(s) 118 based on the activity signal. At 303, the CCA counter monitoring module 136 monitors the CCA counter and/or tracks the CCA values 118. At 304, the power supply monitoring module 138 may monitor power supply charge levels, such as battery charge levels of the power supply 130. The CCA monitoring module and the power supply monitoring modules may be referred to as parameter monitoring modules that monitor network device parameters, such as the CCA values and the charge levels.

At 305, the CT window adjusting module 140 adjusts CT window parameters, such as mini-CT window or CT window length and/or the number of CT windows within a predetermined CT window period. The CT window parameters may be stored as part of the CT window table 142. The CT window parameters may be adjusted based on activity and/or type of activity. The type of activity may refer to whether the activity is associated with selectable devices, unselectable devices, whether the activity is associated with the selected frequency band, etc. The CT window parameters are adjusted based on the CCA values 118 and/or the power supply charge levels. The CCA values 118 may be reset to 0 after each discovery request signal and/or TBTT.

The CT window adjusting module 140 may increase length of a CT window and/or increases the number of CT windows to prevent missing a client response signal. The CT window adjusting module 140 may also decrease length of a CT window and/or decrease the number of CT windows when there is a reduced amount of activity on the medium and/or the power supply charge levels are less than a predetermined threshold. This conserves energy. As an example, the CT window adjusting module 140 may reduce the CT window length and/or the number of CT windows when a power supply charge level is less than 10%.

At 306 and during the active mode, the discovery generator module 152 generates listen mode, sleep mode, and/or CT window timing values (e.g., start and end CT window times).

At 307, the channel selection module 154 selects one or more frequencies and/or channels on which to transmit discovery request signal(s). The discovery request signal(s) may be one of beacon signal(s) and probe request signal(s).

At 308, the PHY device 103 transmits the discovery request signal(s) on one or more of the selected frequencies and/or channels and based on at least one of the listen mode, sleep mode and/or CT window timing values. Discovery request signals may be transmitted at beacon intervals or probe request intervals.

The discovery request signal(s) may include a P2P information element (IE). The discovery request signals and/or P2P IE may include: CT window information (start and end times and length); an opportunistic power save (OPS) bit; a notice of absence (NOA) sub-element; a group owner intent value; security keys; etc. The OPS bit indicates whether the group owner is operating in a power save mode. The NOA sub-element indicates when the group owner GO is to operate in the sleep mode. The group owner intent value may be used to determine which network device should be the group owner.

At 309, the group owner operates in a listen mode. The listen mode may be enabled by the discovery control module 150 or the power management module 106. The listen mode may have a fixed or random start time, duration and/or end time and is based on the listen mode timing values of 172. During the listen mode, the group owner listens for and receives probe request signals and sends probe response signals. During the listen mode, the group owner may also send beacons periodically. During the listen mode, the group owner may also listen for beacons and/or probe request signals from other mobile and/or non-mobile devices.

At 311, the discovery control module 150 determines whether discovery (beacon or probe) response signals were received. P2P clients send beacon or probe response signals to join a P2P network. The discovery control module 150 proceeds to 314 when beacon or probe response signals were received, otherwise to 330.

At the end of a CT window period and when the CCA counter is 0, there is no activity on the medium. In other words, no packets were transmitted from a P2P client or to and/or from a Legacy client. This may be determined by the group owner via the CCA counter and the CT window adjusting module 140. The group owner may return to the sleep mode after determining that there is no activity and/or after receiving one or more PM signals of 1.

At 314, the discovery control module 150 determines whether no devices are discovered and/or whether unselectable devices are discovered. At 315, the group owner may adjust CT window parameters, such as the length of a current CT window and/or subsequent CT windows, and/or the number of CT windows with a predetermined period. The adjustments may be based on the activity and/or type of activity detected in steps 311. The type of activity may refer to whether the activity is associated with selectable, unselectable devices, whether the activity is associated with the selected frequency band, etc.

At 316, the discovery control module 150 operates in a sleep mode when no devices are discovered and/or unselectable devices are discovered. The sleep mode may be initiated by the discovery control module 150 or by the power management module 106.

During the sleep mode the power management module 106 may partially or fully deactivate any of the modules and/or devices of the group owner. A portion of the discovery control module 150 and/or the power management module 208 may remain in an active state during the sleep mode. The discovery control module 150 and/or the power management module 208 may wake up modules and/or devices of the group owner subsequent to the sleep mode.

At 319, the user interface module 158 may indicate to a user the discovered devices for selection by the user. At 320, the device selector module 156 may select one of and/or communicate with the discovered devices. The selection may be based on a user request signal and/or based on a selection criterion, as described above. At 322, the PHY device 103 may transmit unicast signals to the discovered devices to obtain additional information from selected devices. The additional information may include characteristics and capabilities of the discovered devices. The group owner may attach to the one or more of the discovered and/or selected devices.

At 324, the discovery control module 150 may deactivate the discovery mode. The group owner may continue to communicate with the selected device. The group owner may remain awake until reception of a PM signal of 1 from the selected P2P device.

At 330, the discovery control module 220 determines whether beacon or probe request signal(s) are received. The discovery control module proceeds to 331 when beacon or probe request signal(s) are received, otherwise to 338.

At 331, the peer device with the highest group owner intent value is designated the group owner. Connections between the group owner and P2P clients are established. The group owner may provide CT window information before or after step 331. At 332, the user interface module 158 may indicate to a user the discovered devices that transmitted the beacon or probe request signal(s) for selection by the user.

At 333, the device selector module 156 selects and/or communicates with the discovered devices that transmitted the beacon or probe request signal(s). The selection may be based on a user request signal and/or based on a selection criterion, as described above. At 334, the discovery control module 150 instructs the PHY device 103 to generate a beacon and/or probe response signals, which are transmitted to the discovered and/or selected devices. The group owner may attach to the selected devices. The group owner may transmit request signals to obtain additional information from the discovered devices, such as characteristics and capabilities of the discovered devices. At 336, the discovery control module 150 may deactivate the discovery mode.

At 338, the discovery control module 150 may operate in a sleep mode at 316, which may be self initiated or initiated by the power management module 106.

The above-described tasks of the methods of FIG. 6 are meant to be illustrative examples; the tasks may be performed sequentially, synchronously, simultaneously, continuously, during overlapping time periods or in a different order depending upon the application. For example, when operating in a full-duplex mode, a mobile device may transmit discovery request signals while listening for discovery request signals and/or discovery response signals. Thus, 308 and 309 may be performed during the same time period.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A first device comprising:
    a physical-layer device configured to
        transmit, during each of a first plurality of windows, a request signal from the first device to discover one or more network devices, wherein the first plurality of windows occur during a first period of time, and
        receive from a plurality of network devices respective responses to the request signal, wherein each of the responses to the request signal is received during a respective one of the first plurality of windows;
    an adjusting module configured to, based on the responses to the request signal, determine whether to adjust (i) lengths of a second plurality of windows, or (ii) a number of the second plurality of windows to occur during a second period of time, wherein the second period of time occurs subsequent to and is a same length as the first period of time; and
    a power module configured to, during each of the second plurality of windows, transition the first device between (i) being powered ON and (ii) being at least partially powered OFF.

2. The first device of claim 1, wherein:
    the physical-layer device is configured to
        transmit, during each of the second plurality of windows, the request signal from the first device to discover one or more network devices, and
        receive from a second plurality of network devices respective responses to the request signal transmitted during the second plurality of windows; and
    each of the responses to the request signal transmitted during the second plurality of windows is received during a respective one of the second plurality of windows.

3. The first device of claim 1, wherein the adjusting module is configured to, based on an amount of activity between the first device and the plurality of network devices, determine whether to adjust (i) the lengths of the second plurality of windows, or (ii) the number of the second plurality of windows to occur during the second period of time.

4. The first device of claim 1, wherein the adjusting module is configured to, based on a type of activity between the first device and the plurality of network devices, determine whether to adjust (i) the lengths of the second plurality of windows, or (ii) the number of the second plurality of windows to occur during the second period of time.

5. The first device of claim 1, further comprising a monitoring module configured to monitor a charge level of a power supply,
    wherein the adjusting module is configured to, based on the charge level of the power supply, determine whether to adjust (i) the lengths of the second plurality of windows, or (ii) the number of the second plurality of windows to occur during the second period of time.

6. The first device of claim 1, wherein a length of the first period of time is less than a length of a beacon interval of the first device.

7. The first device of claim 1, wherein:
    the first plurality of windows occurs during a first beacon interval;

the second plurality of windows occurs during a second beacon interval; and the power module is configured to at least partially power down the first device during each of the first beacon interval and the second beacon interval.

8. The first device of claim 1, further comprising a counter configured to increment a value based on activity on a medium, wherein the first device communicates via the medium with the plurality of network devices, wherein the adjusting module is configured to, based on the value, determine whether to adjust (i) the lengths of the second plurality of windows, or (ii) the number of the second plurality of windows to occur during the second period of time.

9. The first device of claim 1, wherein the adjusting module is configured to, based on the responses to the request signal, adjust the lengths of the second plurality of windows.

10. The first device of claim 1, based on the responses to the request signal, adjust the number of the second plurality of windows to occur during the second period of time.

11. The first device of claim 1, wherein:

the physical layer device is configured to receive a first signal and a second signal from a second network device;

the first device is configured to (i) based on the first signal, power ON to operate in an active mode, and (ii) based on the second signal, at least partially power OFF to operate in a sleep mode; and the adjusting module is configured to, based on the first signal, determine whether to adjust (i) the lengths of the second plurality of windows, or (ii) the number of the second plurality of windows to occur during the second period of time.

12. The first device of claim 1, wherein the physical layer device is configured to (i) transmit a beacon signal and then operate in a listen mode, (ii) receive a power signal from a second network device, and (iii) power ON to operate in an active mode based on the power signal.

13. A method comprising:

transmitting, during each of a first plurality of windows, a request signal from a physical-layer device of a first device to discover one or more network devices, wherein the first plurality of windows occur during a first period of time, and receiving from a plurality of network devices respective responses to the request signal, wherein each of the responses to the request signal is received during a respective one of the first plurality of windows;

based on the responses to the request signal, determining whether to adjust (i) lengths of a second plurality of windows, or (ii) a number of the second plurality of windows to occur during a second period of time, wherein the second period of time occurs subsequent to and is a same length as the first period of time; and during each of the second plurality of windows, transitioning the first device between (i) being powered ON and (ii) being at least partially powered OFF.

14. The method of claim 13, further comprising:

transmitting, during each of the second plurality of windows, the request signal from the physical-layer device to discover one or more network devices; and receiving from a second plurality of network devices respective responses to the request signal transmitted during the second plurality of windows, wherein each of the responses to the request signal transmitted during the second plurality of windows is received during a respective one of the second plurality of windows.

15. The method of claim 13, further comprising, based on an amount of activity or a type of activity, adjusting (i) the lengths of the second plurality of windows, and (ii) the number of the second plurality of windows to occur during the second period of time.

16. The method of claim 13, further comprising:

monitoring a charge level of a power supply; and based on the charge level of the power supply, determining whether to adjust (i) the lengths of the second plurality of windows, or (ii) the number of the second plurality of windows to occur during the second period of time.

17. The method of claim 13, wherein a length of the first period of time is less than a length of a beacon interval of the first device.

18. The method of claim 13, further comprising at least partially powering down the first device during each of a first beacon interval and a second beacon interval, wherein:

the first plurality of windows occurs during the first beacon interval; and the second plurality of windows occurs during the second beacon interval.

19. The method of claim 13, further comprising:

incrementing a value based on activity on a medium, wherein the first device communicates, over a network, with the plurality of network devices on the medium; and based on the value, adjusting (i) the lengths of the second plurality of windows, or (ii) the number of the second plurality of windows to occur during the second period of time.

20. The method of claim 13, comprising, based on the responses to the request signal, determining whether to adjust (i) the lengths of the second plurality of windows, and (ii) the number of the second plurality of windows to occur during the second period of time.

* * * * *